(12) United States Patent
Odinak

(10) Patent No.: US 7,392,191 B2
(45) Date of Patent: Jun. 24, 2008

(54) METHOD AND DEVICE TO DISTINGUISH BETWEEN VOICE CONVERSATION AND AUTOMATED SPEECH RECOGNITION

(75) Inventor: Gilad Odinak, Bellevue, WA (US)

(73) Assignee: Intellisist, Inc., Bellevue, WA (US)

( * ) Notice: Subject to any disclaimer, the term of this patent is extended or adjusted under 35 U.S.C. 154(b) by 643 days.

(21) Appl. No.: 09/884,902

(22) Filed: Jun. 18, 2001

(65) Prior Publication Data

US 2002/0143552 A1    Oct. 3, 2002

Related U.S. Application Data

(60) Provisional application No. 60/278,454, filed on Apr. 2, 2001, provisional application No. 60/280,377, filed on Mar. 29, 2001.

(51) Int. Cl.
*G10L 11/00*  (2006.01)
*G10L 15/00*  (2006.01)
*H04M 11/00* (2006.01)

(52) U.S. Cl. ............... 704/270; 704/231; 379/93.09; 379/93.15

(58) Field of Classification Search ............... 704/275; 379/88.04, 242
See application file for complete search history.

(56) References Cited

U.S. PATENT DOCUMENTS

| 5,764,644 | A  | * | 6/1998 | Miska et al. | 370/465 |
|---|---|---|---|---|---|
| 5,855,003 | A  | * | 12/1998 | Ladden et al. | 704/270 |
| 6,161,085 | A  | * | 12/2000 | Haavisto et al. | 704/201 |
| 6,363,349 | B1 | * | 3/2002 | Urs et al. | 704/275 |
| 6,398,105 | B2 | * | 6/2002 | Ramberg et al. | 235/375 |
| 6,766,291 | B2 | * | 7/2004 | Chu et al. | 704/215 |
| 7,047,182 | B2 | * | 5/2006 | Masuichi | 704/7 |
| 2001/0033643 | A1 | * | 10/2001 | Mulvey et al. | 379/196 |
| 2002/0103639 | A1 | * | 8/2002 | Chang et al. | 704/223 |
| 2002/0123889 | A1 | * | 9/2002 | Sienel et al. | 704/231 |

* cited by examiner

*Primary Examiner*—David Hudspeth
*Assistant Examiner*—Matthew J. Sked
(74) *Attorney, Agent, or Firm*—Black Lowe & Graham PLLC

(57) ABSTRACT

A method and device for performing some preprocessing on voice transmissions depending upon the intended destination of the transmission. The device includes a receiving component configured to receive a voice signal from a source over a network. The device also includes a processing component configured to determine a destination address associated with the received signal, determine a signal processing algorithm from a plurality of signal processing algorithms based on the determined address, and process the voice signal according to the specified algorithm. The device further includes a delivery component configured to send the processed signal to the associated address.

6 Claims, 5 Drawing Sheets

METHOD AND DEVICE TO DISTINGUISH BETWEEN VOICE CONVERSATION AND AUTOMATED SPEECH RECOGNITION

PRIORITY CLAIM

This application claims priority from Provisional Applications filed Mar. 29, 2001, Ser. No. 60/280,377, and Apr. 2, 2001, Ser. No. 60/278,454.

BACKGROUND

Voice transmission over a digital wireless network involves capturing sound waves using a microphone and converting them to electrical signals and then binary data. The process comprises sampling, digitizing, and other digital signal processes at the receiver unit (e.g., telematics module or cell phone.)

There is a fundamental difference between the way humans process auditory input and the way automated speech recognition (ASR) servers process voice input. Thus, different algorithms for signal processing should be used. In current applications, however, a single, compromise process is used, with resultant inefficiencies.

SUMMARY

The present invention provides a method and computer-based device for performing preprocessing on voice transmissions depending upon the intended transmission destination. The device includes a receiving component configured to receive a voice signal from a source over a network. Also included are a processing component configured to determine a destination address associated with the received signal, determine a signal processing algorithm from a plurality of signal processing algorithms based on the destination address, and process the voice signal according to the specified algorithm. The device further includes a delivery component configured to send the processed signal to the associated address.

In accordance with other aspects of the invention, the device also includes memory configured to store addresses with an associated signal processing algorithm, wherein the processing component finds in memory a signal processing algorithm that is associated with the determined destination address.

In accordance with yet other aspects of the invention, the device includes an alert component configured to alert the recipient that the voice signal is from a computer-based system, if the source is a computer-based system.

In accordance with still another aspect of the invention, the computer-based device includes four additional components used to facilitate the present invention: a first component configured to select an address for a voice transmission; a second component configured to receive a phonation inputted for the voice transmission; a third component configured to process the received phonation according to an algorithm associated with a speech recognition device (if the selected address is associated with a speech recognition device) and send the processed phonation to the selected destination; and a fourth component configured to send the received phonation to the selected destination according to a delivery method associated with human recipients (if the selected address is not associated with a speech recognition device).

In accordance with still further aspects of the invention, a computer-based device includes four additional components used to facilitate the present invention: a first component configured to process a phonation at a source for reception by a human recipient; a second component configured to send the processed phonation to a destination according to an address associated with the phonation; a third component configured to receive a change signal from the destination; and a fourth component configured to process a next phonation for reception by a speech recognition server according to a received change signal, and send the newly processed phonation to the destination.

As will be readily appreciated from the foregoing summary, the invention provides a method and device for improving voice transmissions by performing some preprocessing on voice transmissions depending upon the intended destination, and for providing recipients with caller identification information if the transmission is computer generated.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
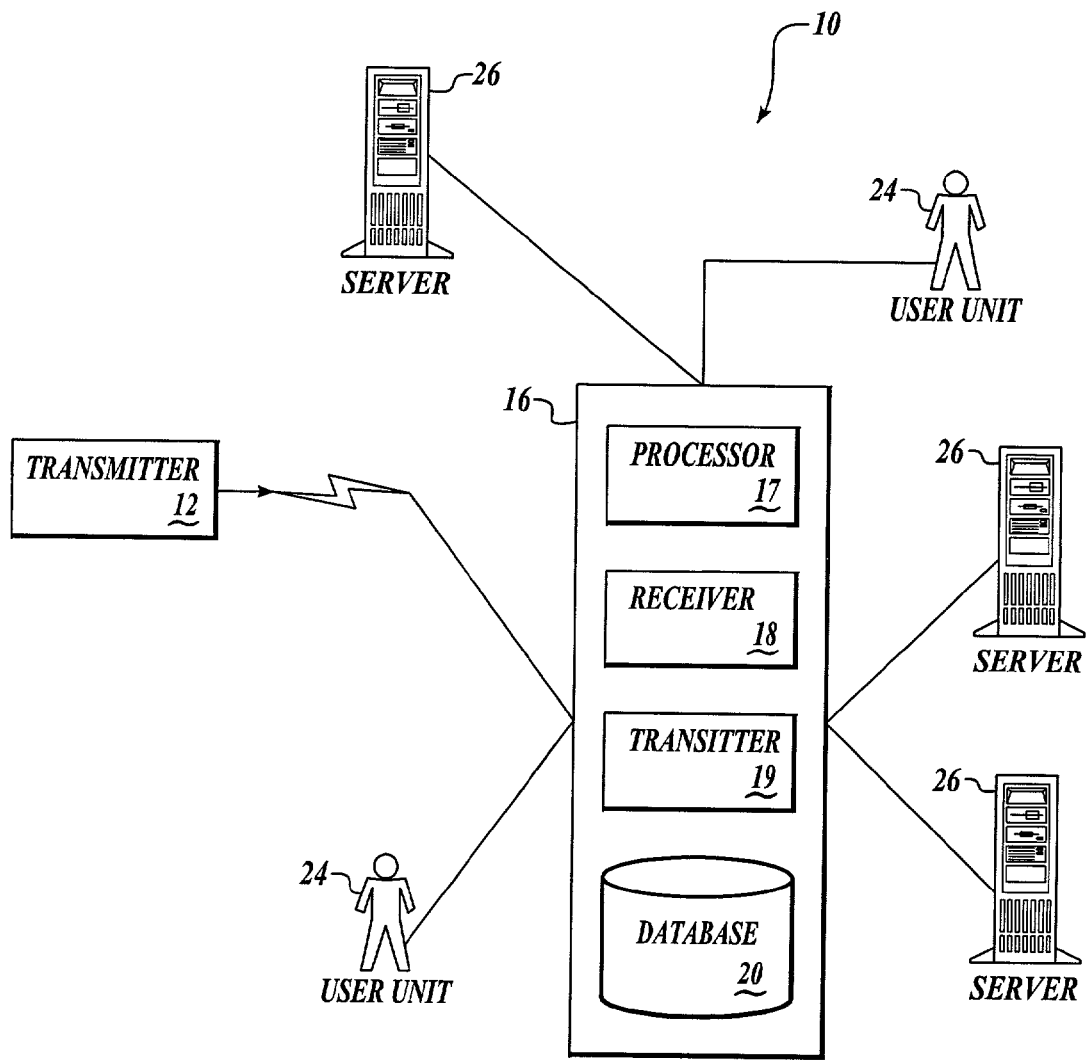
FIG. 1 is a diagram illustrating an exemplary system for receiving and processing voice transmission signals over a wireless network in accordance with the present invention.

The present invention provides a method and device to determine the destination of a voice transmission signal and apply an appropriate data signal processing algorithm based on the determined destination. The same system also provides a method to distinguish between incoming calls sent from a server that includes a speech message or from a human source in order to notify the person receiving the call that an unsolicited call is being sent by a machine that transmits speech content or from a human source. By way of overview and with reference to FIG. 1, the present invention includes a system 10 that includes a transmitter 12 and a distribution gateway 16. Transmitter 12 includes a cellular or landline telephone, network phone, other communication device or a voice generation computer that generates a signal having voice sounds discernible by algorithms configured to recognize speech content and speech sources for transmission to end units (users 24 or voice recognition servers 26) over a network, such as a wireless network or a primarily non-wireless network (e.g., Internet). Distribution gateway 16 includes a processor 17, a receiver 18, a transmitter 19, and a database 20. Receiver 18 in distribution gateway 16 is preferably a wireless communication module capable of receiving voice and data via a wireless communication link. Transmitter 19 in distribution gateway 16 is preferably a wireless communication module capable of sending voice and data via a wireless communication link. Distribution gateway 16 is in communication with one or more user end units 24 and one or more automated speech recognition (ASR) servers 26, either directly or over a network (not shown).

Processor 17 compares an address included in the voice transmission signal from transmitter 12, such as an Internet Protocol (IP) address, a telephone number, or other method of identifying an incoming call, to a lookup table stored in database 20. The processor applies one of a number of signal processing algorithms depending upon the results of the comparison. Because there is a fundamental difference between the way humans process auditory input and the way ASR servers process voice input, different algorithms are applied to the voice transmission signal to optimize the benefit for the determined destination. For example, if the destination is an ASR server 26, the algorithm converts the transmission to digital form (if not already in digital form) and performs other digital signal processing that benefit the process the ASR server will perform.

Figure 2:
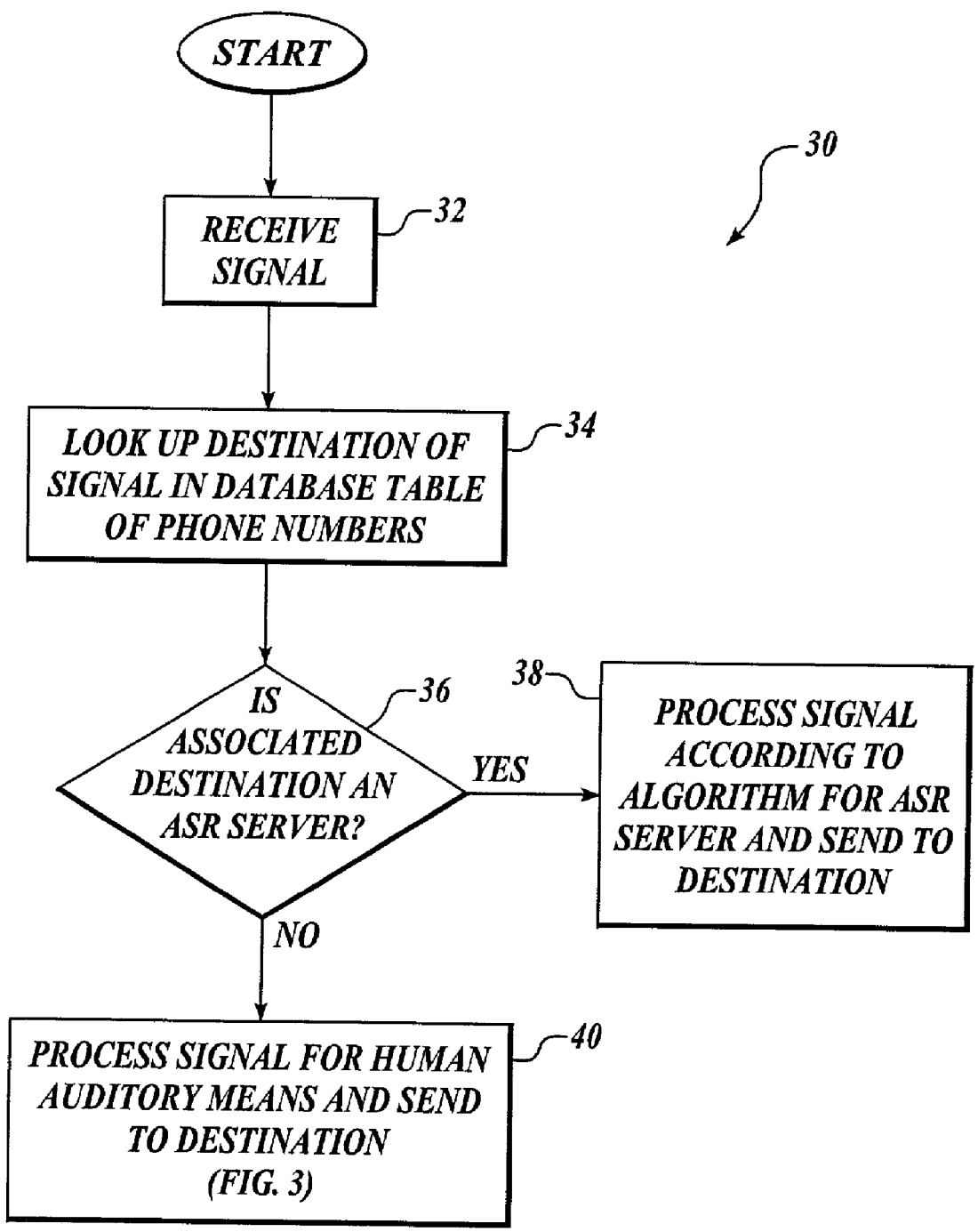
FIG. 2 is a flow chart illustrating operation of the present invention.

Referring now to FIG. 2, an illustrative routine 30 for operation of the present invention will be described. At block 32, distribution gateway 16 receives a voice transmission signal. Typically, the voice transmission signal includes a human voice or voice generated by a computer. At block 34, processor 17 looks up information in database 20 corresponding to a destination address or phone number included in the voice transmission signal. The database includes a table of phone numbers or a table of IP addresses of destinations (user end units 24 and servers 26) that are associated with each algorithm. An IP address is specified by the Internet Protocol and uniquely identifies a computer on the Internet. Processor 17 determines which algorithm (identified as the associated algorithm) to use for optimization depending upon the destination IP address of the voice transmission received. Therefore, when a call is placed to one of the numbers associated with an ASR server, the processor chooses the algorithm optimized for an ASR server. Otherwise, the processor chooses the algorithm for voice conversation at an end user unit 24.

At decision block 36, processor 17 determines whether the associated destination number is an ASR server 26. If, at block 36, the processor determines that the associated destination number is an ASR server 26, then, at block 38, the processor processes the voice transmission according to the optimization algorithm for an ASR server and sends the processed voice transmission signal to the determined destination. If, at block 36, the processor determines that the associated destination number is not an ASR server 26, the processor processes the voice transmission signal for human auditory means according to an optimization algorithm used for producing a result best suited for a human recipient. At block 40, the processor sends the processed voice transmission signal to the determined destination.

Figure 3:
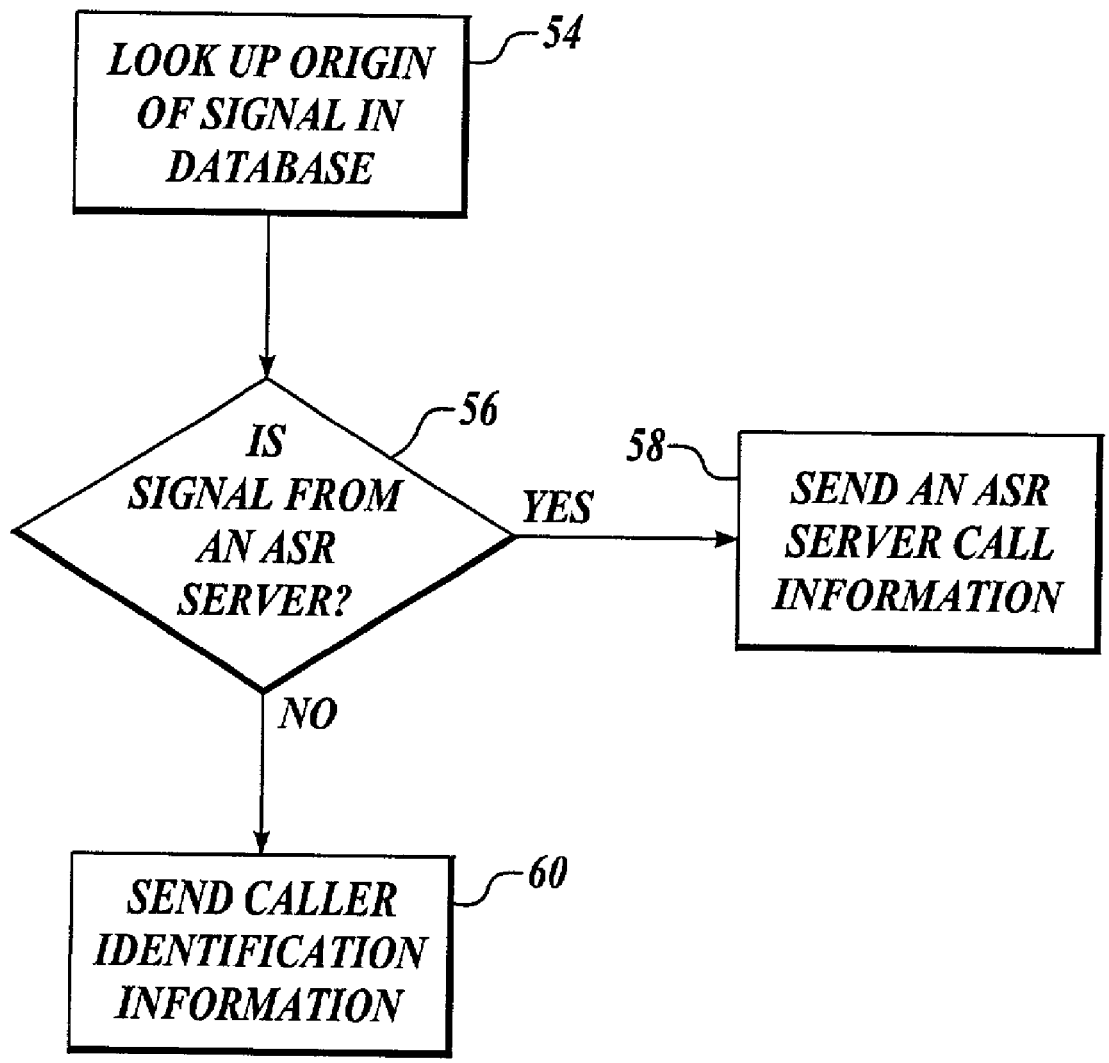
FIG. 3 is a flow chart illustrating an alternate aspect of the present invention.

FIG. 3 is a flowchart illustrating an operation of sending a signal to a human recipient at block 40 of FIG. 2. In this situation, at block 54, processor 17 looks up caller identification information related to the origin of the signal (transmitter 12 in database 20). At decision block 56, the processor determines the origin of the voice transmission signal by comparing the sending address included in the voice transmission signal to a table of stored IP addresses or phone numbers in database 20. Thus, the processor distinguishes between incoming calls from an ASR server or other calls. If, at block 56, the processor determines that the voice transmission signal originated from an ASR server, the logic proceeds to block 58, where the user unit is informed that the incoming call is an ASR server generated voice transmission signal (i.e. a solicitation). If, at block 56, the processor determines the origin is not from the ASR server, then the logic proceeds to block 60, where caller identification information is presented to the user.

Figure 4:
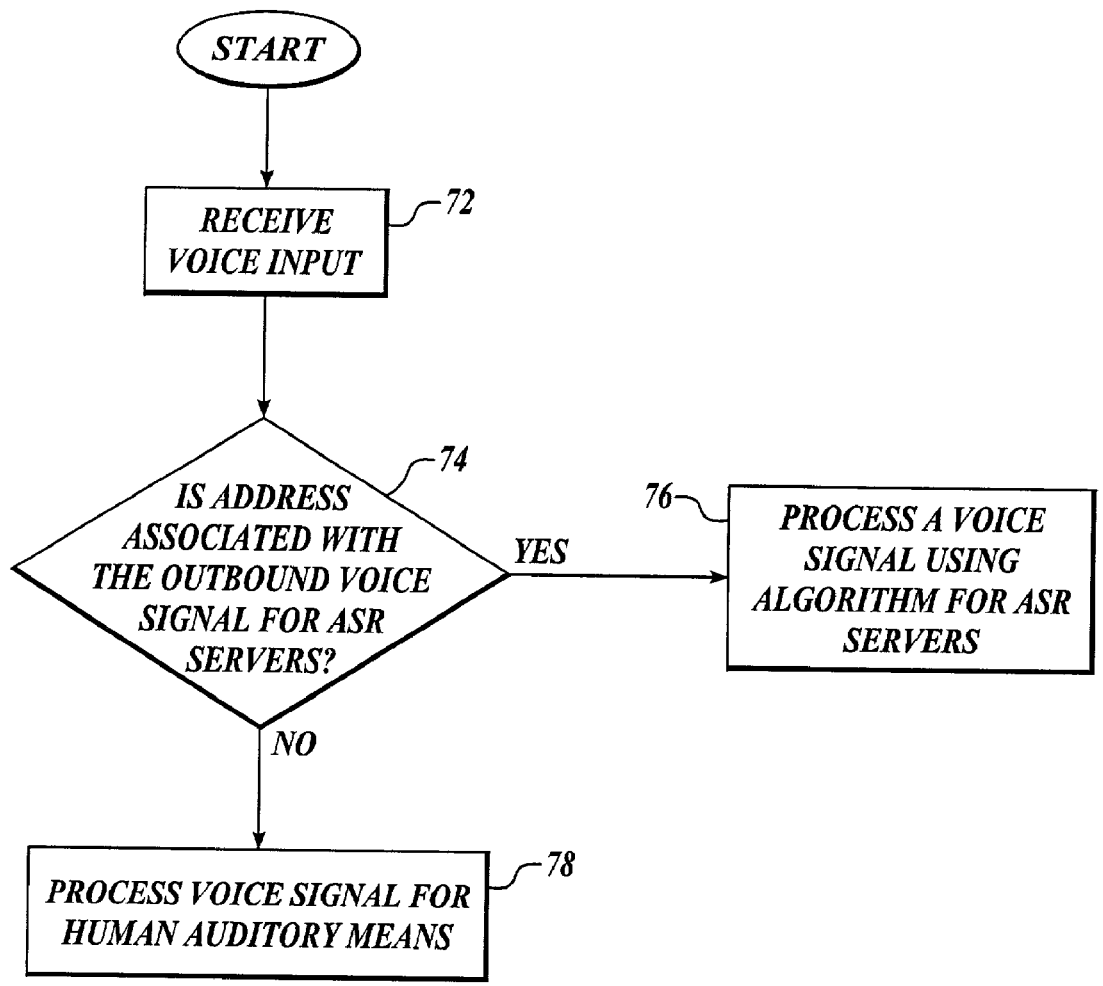
FIGS. 4-5 are flow charts illustrating alternative aspects of the present invention.
Figure 5:
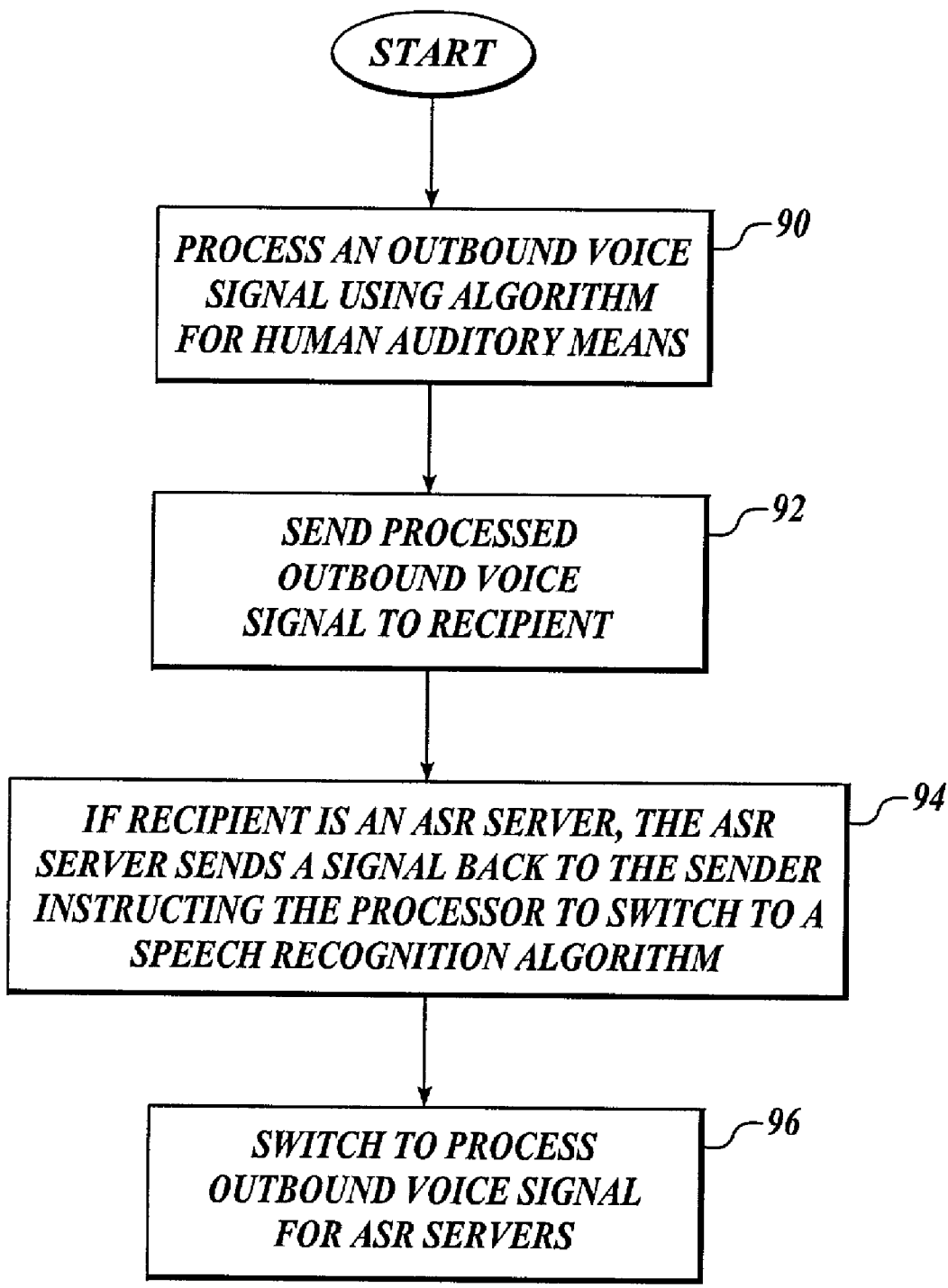

In an alternate embodiment, the functions performed by distribution gateway 16 are performed at a user origination unit or transmitter 12 or at user end unit 24. The user origination unit or transmitter 12 is preferably a mobile device that is implemented in a vehicle. The user origination unit can be a device similar to user end unit 24. FIGS. 4 and 5 illustrate flowcharts that present two embodiments for performing some signal processing at the user origination unit or transmitter 12.

In a first embodiment (FIG. 4) where distribution gateway functions are performed at user origination unit or transmitter 12, a processor at the user origination unit or transmitter 12 is defaulted to process an outbound voice signal with an algorithm optimized for delivery to an ASR server. At block 72, the processor at the user origination unit or transmitter 12 receives voice input from the user and an address associated with the voice input. The associated address can be entered by the user or automatically generated by the processor at the user origination unit or transmitter 12. At decision block 74, the processor at the user origination unit or transmitter 12 compares the address associated with the inputted voice signal to addresses (phone numbers, IP addresses or other types of addresses) associated with ASR servers that are stored within a database at the user unit. When the processor determines that the associated address corresponds to a stored address, the inputted voice is processed according to the default algorithm (automated speech recognition algorithm) at block 76. Otherwise, the logic proceeds to block 78, where the processor processes the inputted voice using a voice communication algorithm for human recipients.

In a second embodiment (FIG. 5) where server functions are performed at the user origination unit or transmitter 12, the processor at the user origination unit or transmitter 12 is defaulted to process an outbound voice signal with an algorithm optimized for voice conversation (human recipient) (block 90). At block 92, the processed voice signal is sent to the addressee associated with the voice signal. At block 94, if the outbound voice signal goes to an ASR server, the ASR server sends a signal back to the user origination unit instructing the processor of the user origination unit to switch to an algorithm optimized for an ASR server. When the user origination unit receives a signal to switch, the unit processes the entered voice signals using an algorithm for an ASR server (block 96). The signal sent by the ASR server is preferably sent in Dual Tone Multiple Frequency also known as Touch Tone, but can also be sent in other formats.

When the voice signal is processed at the user origination unit or transmitter 12, there may be times when the destination switches from an ASR server to a human recipient or from a human recipient to an ASR server. An operator system (human recipient) or ASR server informs the user origination unit when a switch has occurred. Once the user origination unit has been informed of the switch, the unit begins processing according to the new recipient.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
preprocessing a received signal according to a transmission destination of the received signal to determine a signal path to the transmission destination from a user input unit;
determining a processing algorithm from a plurality of signal processing algorithms including algorithms to assist speech recognition based on the transmission destination;

processing the received signal according to the determined algorithm; and sending the processed signal to the transmission destination from the user input unit.

2. The method of claim 1, wherein determining the processing algorithm comprises matching a database lookup table entry and a signal processing algorithm, such that the signal processing algorithm is configured to improve the processed signal for the determined transmission destination.

3. The method of claim 1, further comprising:

determining the originator of the received signal, if the determined transmission destination is a human recipient; and if the determined originator is a computer-based system, alerting the recipient that the voice signal is from a computer-based system.

4. A method comprising:

sending a signal from a user input source to a transmission destination according to an address associated with a generated phonation and preprocessing the signal to generate a change signal; and if the transmission destination is a speech recognition server, sending the change signal from the transmission destination to the user input source, determining a signal path, generating a phonation for reception by a speech recognition server, and sending the newly processed phonation, otherwise generating a phonation at the user input source for reception by a human recipient.

5. A computer-based device comprising:

a first component configured to process a phonation at a user input source for reception by a human recipient;

a second component configured to send the processed phonation to a transmission destination according to an address associated with the phonation on a determined signal path;

a third component configured to receive a change signal from the transmission destination; and a fourth component configured to process a next phonation for reception by a speech recognition server according to a received change signal, and send the newly processed phonation to the transmission destination on the signal path.

6. An apparatus comprising:

means for processing a phonation at a user input source for reception by a human recipient;

means for sending the processed phonation to a transmission destination according to an address associated with the phonation on a determined signal path; and if the destination is a speech recognition server, means for sending a change signal from the transmission destination to the user input source, means for processing a next phonation for reception by a speech recognition server, and means for sending the newly processed phonation on the signal path.

* * * * *